US009208796B2

(12) United States Patent
Thepie Fapi et al.

(10) Patent No.: US 9,208,796 B2
(45) Date of Patent: Dec. 8, 2015

(54) ESTIMATION OF SPEECH ENERGY BASED ON CODE EXCITED LINEAR PREDICTION (CELP) PARAMETERS EXTRACTED FROM A PARTIALLY-DECODED CELP-ENCODED BIT STREAM AND APPLICATIONS OF SAME

(75) Inventors: Emmanuel Rossignol Thepie Fapi, Montreal (CA); Eric Poulin, Pierrefonds (CA); Jean Pierre Doyon, Saint-Jean-sur-Richelieu (CA)

(73) Assignee: GENBAND US LLC, Plano, TX (US)

( * ) Notice: Subject to any disclaimer, the term of this patent is extended or adjusted under 35 U.S.C. 154(b) by 361 days.

(21) Appl. No.: 13/214,641

(22) Filed: Aug. 22, 2011

(65) Prior Publication Data
US 2013/0054230 A1 Feb. 28, 2013

(51) Int. Cl.
| G10L 21/02 | (2013.01) |
| H04M 11/00 | (2006.01) |
| G10L 25/06 | (2013.01) |
| H04M 3/56 | (2006.01) |
| H04N 7/15 | (2006.01) |
| G10L 25/21 | (2013.01) |

(52) U.S. Cl.
CPC .............. *G10L 25/06* (2013.01); *G10L 25/21* (2013.01); *H04M 3/56* (2013.01); *H04N 7/152* (2013.01)

(58) Field of Classification Search
CPC ....... G10L 19/12; G10L 19/06; G10L 19/005; G10L 19/10; G10L 19/04
USPC .......................................... 704/219
See application file for complete search history.

(56) References Cited

U.S. PATENT DOCUMENTS

| 5,150,410 | A | * | 9/1992 | Bertrand | .......................... 380/28 |
| 5,414,796 | A | * | 5/1995 | Jacobs et al. | .................. 704/221 |
| 7,599,834 | B2 | * | 10/2009 | Raad et al. | .................... 704/219 |
| 2002/0097857 | A1 | | 7/2002 | Kwan | |
| 2003/0023428 | A1 | * | 1/2003 | Chang et al. | .................. 704/201 |

(Continued)

FOREIGN PATENT DOCUMENTS

| EP | 1083548 A2 | * | 3/2001 |
| EP | 03022252.5 | * | 10/2003 |
| WO | 99/35639 A1 | | 7/1999 |

OTHER PUBLICATIONS

Thepie Fapi, E., Beaugeant, C., Taddei, H., and Pastor, D., "Noise Reduction within Network through Modification of LPC Parameters", 7th International ITG Conference on Source and Channel Coding (SCC). Jan. 2008. IEEE.*

(Continued)

Primary Examiner — Brian Albertalli
(74) Attorney, Agent, or Firm — Fogarty, L.L.C.

(57) ABSTRACT

Methods, systems, and non-transitory computer readable media for estimating speech energy of an encoded bit stream based on coding parameters extracted from the partially-decoded bit stream are disclosed. In an embodiment, a disclosed method includes receiving a CELP-encoded bit stream, partially decoding the bit stream, and estimating the speech energy of the bit stream based a set of four or fewer CELP parameters extracted from the partially decoded bit stream. In another embodiment, a disclosed method includes receiving a CELP-encoded bit stream, partially decoding the bit stream, extracting at least one CELP parameter from the partially decoded bit stream, and estimating the speech energy of the bit stream based on the extracted at least one CELP parameter without calculating a linear prediction coding (LPC) filter response energy.

28 Claims, 8 Drawing Sheets

(56) References Cited

U.S. PATENT DOCUMENTS

| | | | |
|---|---|---|---|
| 2006/0217972 A1* | 9/2006 | Sukkar et al. | 704/219 |
| 2007/0025546 A1* | 2/2007 | Jabri et al. | 379/386 |
| 2008/0249766 A1* | 10/2008 | Ehara | 704/203 |
| 2009/0109881 A1* | 4/2009 | Li et al. | 370/280 |

OTHER PUBLICATIONS

Martin Rainer, "Noise Power Spectral Density Estimation Based on Optimal Smoothing and Minimum Statistics", IEEE Transactions on Speech and Audio Processing, vol. 9, No. 5, Jul. 2001. pp. 504-512.*

Gordy, J. D. and Goubran, R. A., "Reduced-Delay Mixing of Compressed Speech Signals for VoIP and Cellular Telephony". Conference Record of the Thirty-Eighth Asilomar Conference on Signals, Systems and Computers. 2004. IEEE. pp. 2270-2274.*

Haykin, Simon, Adaptive Filter Theory, Prentice-Hall, 1986, pp. 125, 139 and 148, EIC 2600 TK 7872.F5 H368 1986 c.2.*

European Patent Office, "Extended European search report" issued in EP Application No. 12181424.8—2225, Mailed Date: Dec. 14, 2012, 9 pages.

Doh-Suk Kim et al.: "Frame energy estimation based on speech codec parameters", Acoustics, Speech and Signal Processing, 2008, Mar. 31, 2008, pp. 1641-1644, Sections 2-4, IEEE International Conference, IEEE, Piscataway, NJ, USA.

European Patent Office, "Communication under Rule 71(3) EPC" issued in EP Application No. 12181424.8—1910, Mailed Date: Feb. 25, 2014, 5 pages.

* cited by examiner

ESTIMATION OF SPEECH ENERGY BASED ON CODE EXCITED LINEAR PREDICTION (CELP) PARAMETERS EXTRACTED FROM A PARTIALLY-DECODED CELP-ENCODED BIT STREAM AND APPLICATIONS OF SAME

TECHNICAL FIELD

The subject matter described herein relates to methods and systems for estimating the speech energy of CELP-encoded bit streams. More particularly, the subject matter described herein relates to using CELP parameters extracted from a partially decoded CELP-encoded bit stream to estimate the speech energy of the bit stream. This avoids the need to fully decode the CELP-encoded bit stream. The estimated speech energy may be used to identify active speakers in, for example, a voice conference having multiple participants, thereby avoiding the need to fully decode bit streams from non-speaking participants.

BACKGROUND

Code excited linear prediction, or CELP, is a method of encoding speech for transmission over a network. CELP is a data compression algorithm that is well suited for digital audio signals containing human speech. CELP and other speech encoders reduce the amount of data that must be transmitted across the network by transmitting compressed (encoded) data to the receiving end, which much decompress (decode) the data to reproduce the audio signal.

As used herein, the term "speech energy" refers to the energy of the audio signal that can be attributed to speech content. An audio stream containing speech is said to have high speech energy, while an audio stream containing silence or background noise but no speech is said to have low speech energy.

There are some situations in which the receiver may want to determine the speech energy of the bit stream and to make some decision based on the determined speech energy. For example, one form of noise reduction is to measure the speech energy of a signal and mute the signal if the speech energy is below some threshold. Automatic gain control circuits may boost the amplification for soft signals (i.e., having low speech energy) and reduce the amplification for loud signals (i.e., having high speech energy).

As another example, in a voice conference having multiple participants, the signal from each participant's microphone is typically sent to a conference bridge, mixed with the signals from the other participants' microphones, and broadcast to the speakers of all the participants. When the number of participants becomes large, simply mixing the input from all microphones becomes impractical, because the signal to noise ratio is reduced and because the competing voices overlap, distort, and/or cancel each other. In other words, the output signal is noisy and the voices of the participants become indistinct. In this situation it is desirable to determine which speakers are actively talking and add only those inputs into the mix. The input signals from speakers who are not talking are not fed into the mix, improving the fidelity of the output.

The standard way to compute the speech energy of a signal is to first obtain the speech signal in PCM samples, then perform the sum squared of those PCM samples, frame-by-frame or sub-frame-by-sub-frame. However, this approach has the disadvantage that the packet payloads must be fully decoded before the signal strength of the voice payload can be measured.

A method to estimate speech signal energy based on EVRC codec parameters is presented in Doh-Suk Kim et al., "Frame energy estimation based on speech codec parameters" ICASSP, 1641-1644 (2008) and U.S. Patent Application Publication No. 2009/0094026 to Cao et al., "Method of determining an estimated frame energy of a communication." In this method, decoded parameters are used to estimate the excitation energy $\lambda_e(m)$, which is used an in input into an LPC synthesis filter. The resulting impulse response represents the estimated LPC synthesis filter energy $\lambda_h(K,m)$, where K is the number of samples used to compute the impulse response. An estimated speech energy $\lambda(m)$ is calculated using the estimated excitation energy $\lambda_e(m)$ and the estimated LPC synthesis filter energy $\lambda_h(K,m)$. While this method provides an estimated frame energy that correlates well with the actual frame energy, this method requires a transform to generate the impulse response of the synthesis filter. Since each frame has its own set of LPC synthesis filter parameters, the impulse response must be recalculated every frame, which is computationally expensive.

Accordingly, there exists need for systems and methods of determining the speech energy of an encoded audio signal without requiring complete decoding of an encoded datastream and without computationally expensive transform operations. Specifically, there exists a need for systems and methods to estimate speech energy based on CELP parameters extracted from a partially-decoded CELP-encoded bit stream. Such an estimation could be used, for example, to select active speakers in a teleconferencing bridge without having to fully decode the CELP-encoded bit streams, and fully decode only the bit streams of some or all of the active speakers.

SUMMARY

According to one aspect, the subject matter described herein includes a method for estimating speech energy of an encoded bit stream based on coding parameters extracted from the partially-decoded bit stream, the method including receiving a CELP-encoded bit stream, partially decoding the bit stream, and estimating the speech energy of the bit stream based on a set of four or fewer CELP parameters extracted from the partially decoded bit stream.

According to another aspect, the subject matter described herein includes a method for estimating speech energy of an encoded bit stream based on coding parameters extracted from the partially-decoded bit stream, the method including receiving a CELP-encoded bit stream, partially decoding the bit stream, extracting at least one CELP parameter from the partially decoded bit stream, and estimating the speech energy of the bit stream based on the at least one extracted CELP parameter without calculating a linear prediction coding (LPC) filter response energy.

According to yet another aspect, the subject matter described herein includes a system for estimating speech energy of a CELP-encoded bit stream based on coding parameters extracted from the partially-decoded bit stream. The system includes an interface module for receiving a CELP-encoded bit stream and a processing module, including a hardware processor, for partially decoding the bit stream and estimating the speech energy of the bit stream based a set of four or fewer CELP parameters extracted from the partially decoded bit stream.

According to yet another aspect, the subject matter described herein includes a system for estimating speech energy of a CELP-encoded bit stream based on coding parameters extracted from the partially-decoded bit stream. The system includes an interface module for receiving a CELP-encoded bit stream and a processing module, including a hardware processor, for partially decoding the bit stream, extracting CELP parameters from the partially decoded bit stream, extracting at least one CELP parameter from the partially decoded bit stream, and estimating the speech energy of the bit stream based on the extracted at least one CELP parameter without calculating a linear prediction coding (LPC) filter response energy.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for estimation of speech energy based on CELP parameters extracted from a partially-decoded CELP-encoded bit stream are provided. In one embodiment, the subject matter described herein discloses methods and systems that partially decode bit streams to extract encoding parameters that are then used to estimate the speech signal energy on a segment-by-segment basis, where a segment may be a frame and/or a sub-frame, for example. Computationally expensive functions such as excitation filtering, post-filtering and post-processing of the synthesized speech are not required. Additional resources, such as a large storage location for storing and accessing decoded speech samples or digital signal processing (DSP) capabilities are not required.

Reference will now be made in detail to exemplary embodiments of the present invention, examples of which are illustrated in the accompanying drawings. Wherever possible, the same reference numbers will be used throughout the drawings to refer to the same or like parts.

Figure 1:
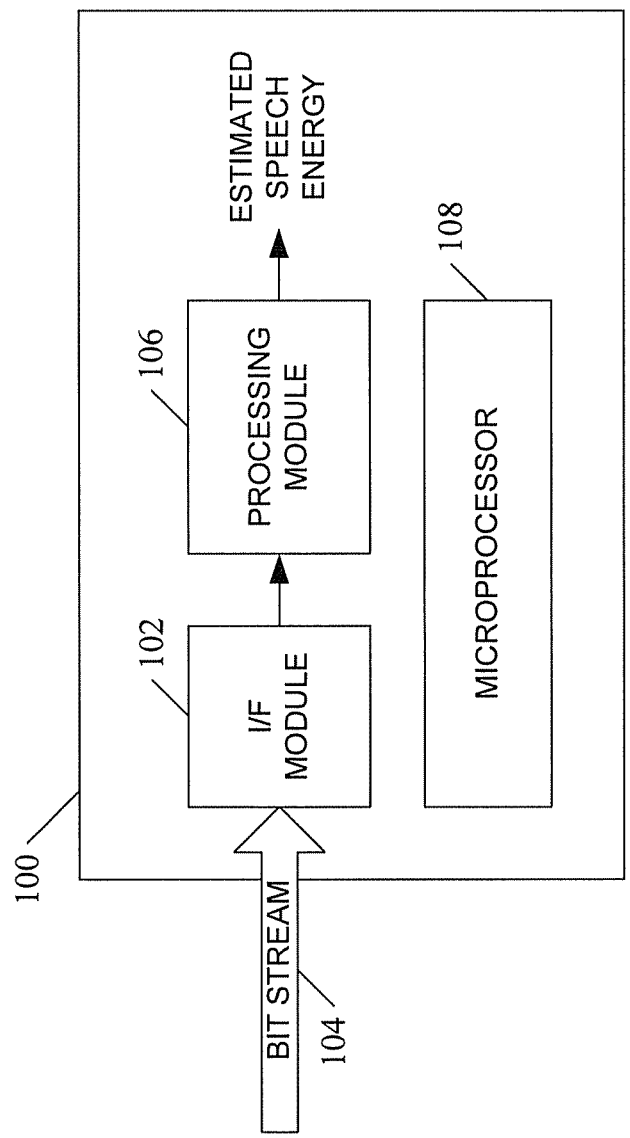
FIG. 1 is a block diagram illustrating an exemplary system for estimating speech energy of a CELP-encoded bit stream based on coding parameters extracted from the partially-decoded bit stream according to an embodiment of the subject matter described herein.

FIG. 1 is a block diagram illustrating an exemplary system for estimating speech energy of a code excited linear prediction (CELP) encoded bit stream based on coding parameters extracted from the partially-decoded bit stream according to an embodiment of the subject matter described herein. In the embodiment illustrated in FIG. 1, system 100 includes an interface module 102 for receiving a CELP-encoded bit stream 104 and a processing module 106 that includes a hardware processor 108 for partially decoding bit stream 104 and estimating the speech energy of bit stream 104 based on a set of four or fewer CELP parameters extracted from the partially decoded bit stream in an alternative embodiment, processing module 106 partially decodes the bit stream, extracts at least one CELP parameter from the bit stream, and estimates the speech energy of the bit stream based on the one or more CELP parameters, and does so without calculating a linear prediction coding filter response energy. By avoiding the step of calculating an LPC filter response energy, processing module 106 can calculate an estimated speech energy for the stream relatively quickly and with relatively few processing resources as compared with prior art systems that estimate speech energy by calculating an LPC filter response energy. In one embodiment, processing module 106 may output a value of the estimated speech energy for use by another process or module.

The specific methods and algorithms used to estimate speech energy will be described below in detail, but in order to compare and contrast the systems and methods of the subject matter described herein with conventional systems and methods, it is helpful to first give an overview of CELP encoding and conventional implementations of CELP codecs.

CELP Codecs

The vast majority of modern speech codecs are based on the CELP principles and thus carry similar quantized parameters, such as the linear prediction coefficients (LPC) through their line spectral frequencies (LSF) representation, the fixed and adaptive gains, the pitch delay and the fixed codebook index. Some speech codecs compress speech by analyzing time slices, or "frames," of audio containing speech and modeling the frame's worth of speech signal as a set of parameters that collectively describe that frame's slice of speech audio. CELP encoding is based on the concept that the human vocal tract can be thought of as a tone source (the vocal cords) at the bottom of a shaped tube (the vocal tract, mouth, sinuses, tongue, etc.). The tone source emits one or more frequencies, and the tube determines the amplitude of the harmonics, e.g., the vocal tract has a particular frequency response, which can change as the shape of the vocal tract changes. Mouth, tongue, and teeth can inject noise into the output, such as when the speaker makes a "T" or "P" sound.

CELP encoders determine a set of parameters that characterize each particular frame or sub-frame. Some parameters define the fundamental frequency and amplitude of the sound created by the vocal cords. For example, the received adaptive gain, $G_A$, and the pitch value, V, (also called pitch delay) are used to reconstruct the adaptive excitation, v(n). Other parameters specify the noise content of the sample. For example, the received fixed codebook index, C, and its associated gain fixed codebook gain, $G_F$, are used to reconstruct the fixed codebook excitation c(n). Still other parameters, called the linear prediction coding (LPC) parameters, define the frequency response of the vocal tract.

As part of the decoding process, these parameters are extracted from the encoded CELP bit stream. The original sample is reconstructed from the extracted parameters by providing an impulse, whose energy is a function of the sum of the fixed codebook excitation c(n) and adaptive excitation v(n), as an input into a finite impulse response filter whose characteristic equation uses the LPC parameters as coefficients. The output of the filter is a complex audio waveform that reproduces or mimics the original.

In digital speech transmission, or telecommunication devices, the energy of the current speech signal can be used to activate other tasks such as VQEs (Voice Quality Enhancements). For example, in a conference bridge, the participants' speech signal energy is used to decide who the active speakers are and therefore who should be mixed. Tandem free operation (TFO) can also benefit from the ability to determine whether a data stream includes active speech without having to fully decode the encoded audio stream. Conventional CELP decoders must fully decode the CELP-encoded bit stream to recreate the original audio signal before the speech energy of the audio signal can be calculated. As mentioned above, this is a processing intensive operation.

The embodiments of the subject matter described herein take advantage of the fact that part of the CELP encoding process involves determining the speech energy of the frame or sub-frame, and that this energy is one component in the derivations of values for $G_A$, v(n), $G_F$, c(n), and LPC. Thus, it is possible to start with values of $G_A$, v(n), $G_F$, c(n), and LPC extracted from a partially decoded CELP frame and perform the inverse calculations to recover the speech energy. By performing the inverse calculations, which will be described in more detail below, the speech energy of the frame or sub-frame can be reconstructed. Furthermore, the speech energy of the frame or sub-frame can be reconstructed without the need to perform the computationally expensive LPC filter transforms that are performed during decoding.

CELP encoding. To understand the inverse calculations used to work backward from the CELP encoded parameters to recover the speech energy of the original signal, it may be useful to explain the forward calculations, performed during CELP encoding, that start with speech energy and result in the CELP parameters. In speech coding, one of the major tasks is to determine the linear prediction coefficients. CELP codec family uses linear prediction analysis to reduce the short term redundancy on speech signal.

To compute the parameters at the encoder, CELP codecs exploit the human speech production mechanism. First the LPC analysis (computation of the LPC coefficients) is applied to remove the short-term redundancy. Then, an adaptive codebook search (leading to pitch delay and adaptive gain) is used to remove the long-term redundancy on the speech signal. Finally, the remaining signal, which is noise like, is modeled based on fixed codebook search (represented by the fixed codebook gain and the index of the fixed codebook vector).

The linear prediction analysis of order M writes the current windowed speech signal sample $S_W(n)$ as a linear combination of a number of past samples using the equation shown below, where M is the number of samples used:

$$\hat{s}_w(n) = -\sum_{k=1}^{M} a_s(k) \cdot s_w(n-k) + e(n) \quad \text{(eq. 1)}$$

Where $A_S=[a_S(1), \ldots, a_S(M)]$ represents the LPC coefficients vector (used to design the coefficients of the linear filter which characterizes the vocal tract) of the current frame's (sub-frame's) speech signal, e(n) is the residual signal or prediction error and $S_W(n)$, n=0, ..., N−1, N is the size of the window.

To estimate the optimal LPC coefficients, the autocorrelation and covariance methods are generally used. These methods select the linear filter coefficients by minimizing the short term energy (squared error) of the residual signal $$E_{ST} = \sum_{n=0}^{N-1} (e(n))^2$$

by least square computation.

$$E_{ST} = \sum_{n=0}^{N-1} \left( s_w(n) + \sum_{k=1}^{M} a_s(k) \cdot s_w(n-k) \right)^2 \quad \text{(eq. 2)}$$

The energy reaches its minimum when the partial derivatives of the squared errors with respect to each coefficient $a_S(k)$ are zero. Autocorrelation method is achieved as follows:

$$\frac{\partial E_{ST}}{\partial a_j} = \quad \text{(eq. 3)}$$

$$0 \Leftrightarrow -\sum_{k=1}^{M} a_s(k) \cdot \sum_{n=0}^{N-1} s_w(n-j) \cdot s_w(n-k) = \sum_{n=0}^{N-1} s_w(n) \cdot s_w(n-j)$$

In Equation 3, the terms $$r_s(j) = \sum_{n=j}^{N-1} s_w(n) \cdot s_w(n-j),$$

$0 \leq j \leq M$ represent the autocorrelation sequence of the windowed frame being analyzed. In matrix representation, this process can be written as:

$$-\Gamma_S \cdot A_S = R_S \quad \text{(eq. 4)}$$

Where the M×M autocorrelation matrix is defined as:

$$\Gamma_S = \begin{pmatrix} r_S(0) & r_S(1) & \ldots & r_S(M-1) \\ r_S(1) & r_S(0) & \ldots & r_S(M-2) \\ \vdots & \vdots & \ddots & \vdots \\ r_S(M-1) & r_S(M-2) & \ldots & r_S(0) \end{pmatrix} \quad \text{(eq. 5)}$$

The autocorrelation vector is given by:

$$R_S = [r_S(1) \, r_S(2) \ldots r_S(M)]^T \quad \text{(eq. 6)}$$

The solution $A_S$ of the linear system in Equation 4 can be obtained by inversing the autocorrelation matrix:

$$A_S = -(\Gamma_S)^{-1} \cdot R_S \quad \text{(eq. 7)}$$

The autocorrelation matrix $\Gamma_S$ is a Toplitz matrix. Iterative techniques are usually used since matrix inversion is computational expensive for practical implementation.

Especially, solutions based on the recursive Levinson-Durbin algorithm are implemented in most recent speech coders. The recursive Levinson-Durbin algorithm is a computational efficient iterative process which results in a drastic reduction of operations and storage location when compared against standard approaches. Fortunately, the Toplitz structure of the autocorrelation matrix involves estimation of $A_S$ such that the associated synthesis filter $$H_S(z) = 1/A_S(z)$$

is stable. Thus, with the explicit knowledge of the speech signal's autocorrelation coefficients $\{r_s(0), \ldots, r_s(M)\}$, the recursive Levinson-Durbin algorithm estimates the LPC coefficients $\{1, a_s(1), \ldots a_s(M)\}$ and the final prediction error $E_{err}$ using the linear system in Equation 3. The recursive Levinson-Durbin algorithm is based on the following formulas. It will appear appropriate to adopt another notation of the LPC coefficients such as: $\{1, a_s(1), \ldots, a_s(M)\} = \{a_0^{(t)}, a_1^{(t)}, \ldots, a_M^{(t)}\}$. During the initial step $a_0^{(0)} = 1$ and $E_{err}(0) = r_S(0)$. After which, for each t iterations, t+1 LPC coefficients are obtained. Then for t, from 1 to M:

$$a_0^{(t)} = 1 \text{ and } a_t^{(t)} = \left[ r_S(t) - \sum_{j=1}^{t-1} a_{t-1}^{(j)} \cdot r_S(t-j) \right] \cdot E_{err}(t-1)^{-1} \quad \text{(eq. 8)}$$

The coefficients $a_1^{(t)}$ represent the reflection coefficients $\kappa_1$. The LPC coefficients from 0 to t−1 are computed based on the formula below:

$$a_k^{(t)} = a_k^{(t-1)} + a_1^{(t)} \cdot a_{k-1}^{(t-k)} \quad \text{(eq. 9)}$$

With k=0, 1, ..., t the final prediction error power is updated as follows:

$$E_{err}(t) = E_{err}(t-1) \cdot (1 - (a_1^{(t)})^2) \quad \text{(eq. 10)}$$

CELP decoding. In conventional CELP decoders, the received adaptive gain $G_A$ and the pitch value are used to reconstruct the adaptive excitation v(n). The received fixed codebook index and its associated gain $G_F$ are used to build the fixed codebook excitation c(n). Both excitations are added to form the final excitation:

$$exc(n) = G_A \cdot v(n) + G_F \cdot c(n) \quad \text{(eq. 11)}$$

and enter the LPC synthesis filter $1/\hat{A}(z)$.

Finally a post-processing and post filtering algorithm is applied to obtain the decoded speech signal ŝ(n). This operation is generally performed frame-by-frame or sub-frame-by-sub-frame. As a result, the final excitation's energy is equivalent to the final prediction error power $E_{err}$ obtained during LPC analysis process at the encoder. The methods described herein take advantage of this equivalence.

Figure 2:
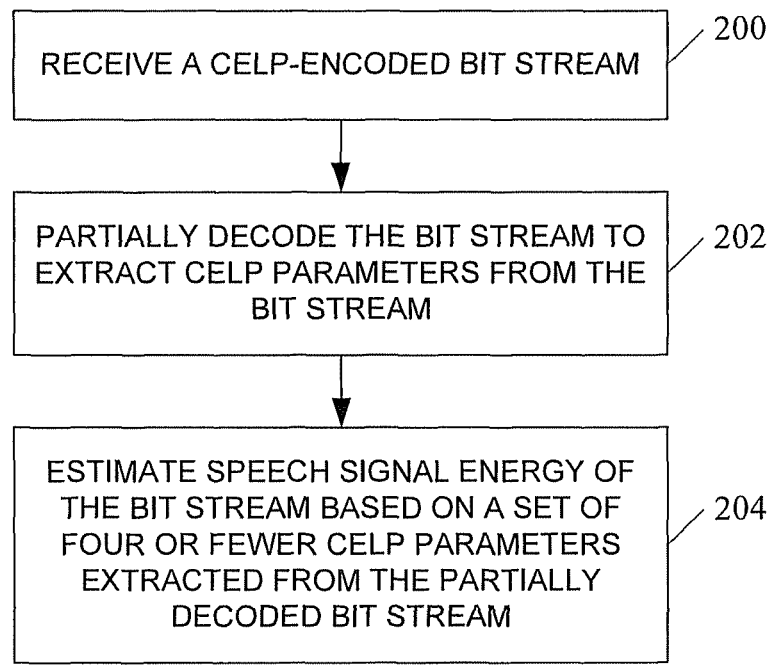
FIG. 2 is a flow chart illustrating an exemplary process for estimating speech energy of a CELP-encoded bit stream based on coding parameters extracted from a partially-decoded bit stream according to an embodiment of the subject matter described herein.

FIG. 2 is a flow chart illustrating an exemplary process for estimating speech energy of a code excited linear prediction (CELP) encoded bit stream based on coding parameters extracted from a partially-decoded bit stream according to an embodiment of the subject matter described herein. In the embodiment illustrated in FIG. 2, at block 200, a CELP-encoded bit stream is received. In one embodiment, the CELP-encoded bit stream may be a bit stream received from a conference participant by a teleconferencing bridge or multimedia conferencing bridge. At block 202, the received bit stream is partially decoded and at least one coding parameter is extracted from the bit stream. In one embodiment, the extracted CELP parameters may include parameters such as a fixed point gain $G_F$, an adaptive gain $G_A$, a pitch value or pitch delay, a fixed codebook index, or a set of LPC coefficients. At block 204, the speech energy of the bit stream is estimated based on a set of four or fewer CELP parameters extracted from the partially decoded bit stream.

Figure 3:
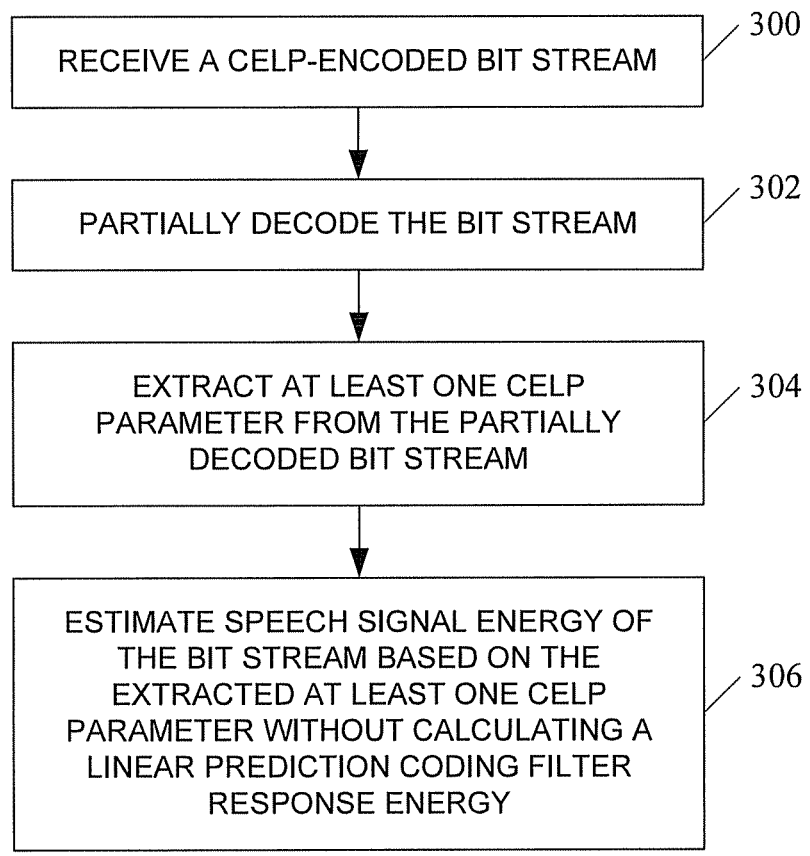
FIG. 3 is a flow chart illustrating an exemplary process for estimating speech energy of a CELP-encoded bit stream based on coding parameters extracted from the partially-decoded bit stream according to another embodiment of the subject matter described herein.

FIG. 3 is a flow chart illustrating an exemplary process for estimating speech energy of a code excited linear prediction (CELP) encoded bit stream based on coding parameters extracted from the partially-decoded bit stream according to another embodiment of the subject matter described herein. In the embodiment illustrated in FIG. 3, at block 300, a CELP-encoded bit stream is received. At block 302, the received bit stream is partially decoded, and at block 304, at least one CELP parameter is extracted from the partially decoded bit stream. At block 306, speech signal energy of the bit stream is estimated based on the one or more CELP parameters that were extracted from the bit stream, where the energy is estimated without calculating a linear prediction coding filter response energy.

Examples of the processes illustrated in FIGS. 2 and 3 will now be described in detail.

Estimation of Speech Energy Using CELP Parameters.

In contrast to conventional methods that calculate speech energy using the fully decoded bit-stream, the subject matter described herein describes methods which partially decode the bit-stream and estimate speech energy based on parameters extracted from the partially decoded bit-stream. Three embodiments will be described in detail: a low complexity embodiment, a medium complexity embodiment, and a high-complexity embodiment, with the higher complexity embodiments giving more accurate estimations of speech energy at the expense of additional processing. Depending on the particular application, an implementation may select the embodiment with the lowest processing cost that gives an acceptably accurate estimation. Alternatively, a system that implements the embodiments described herein may dynamically select the embodiment used based on needed accuracy, available processing resources, or both. The embodiments described herein are intended to be exemplary rather than limiting.

Low Complexity.

In one embodiment, herein referred to as the "low complexity" implementation, the speech energy of the frame or sub-frame is based on one parameter extracted from the partially decoded bit stream. For example, the speech energy for frame m, $E_{ST}(m)$ may be calculated based on the fixed codebook gain $G_F(m)$. In one embodiment, $E_{ST}(m)$ may be calculated according to the equation:

$$E_{ST}(m) = G_F(m) \quad \text{(eq. 12)}$$

In normal conference bridge conditions (where double talk periods represent less than 10%) this method may provide sufficient accuracy at a relatively low processing cost.

Figure 4A:
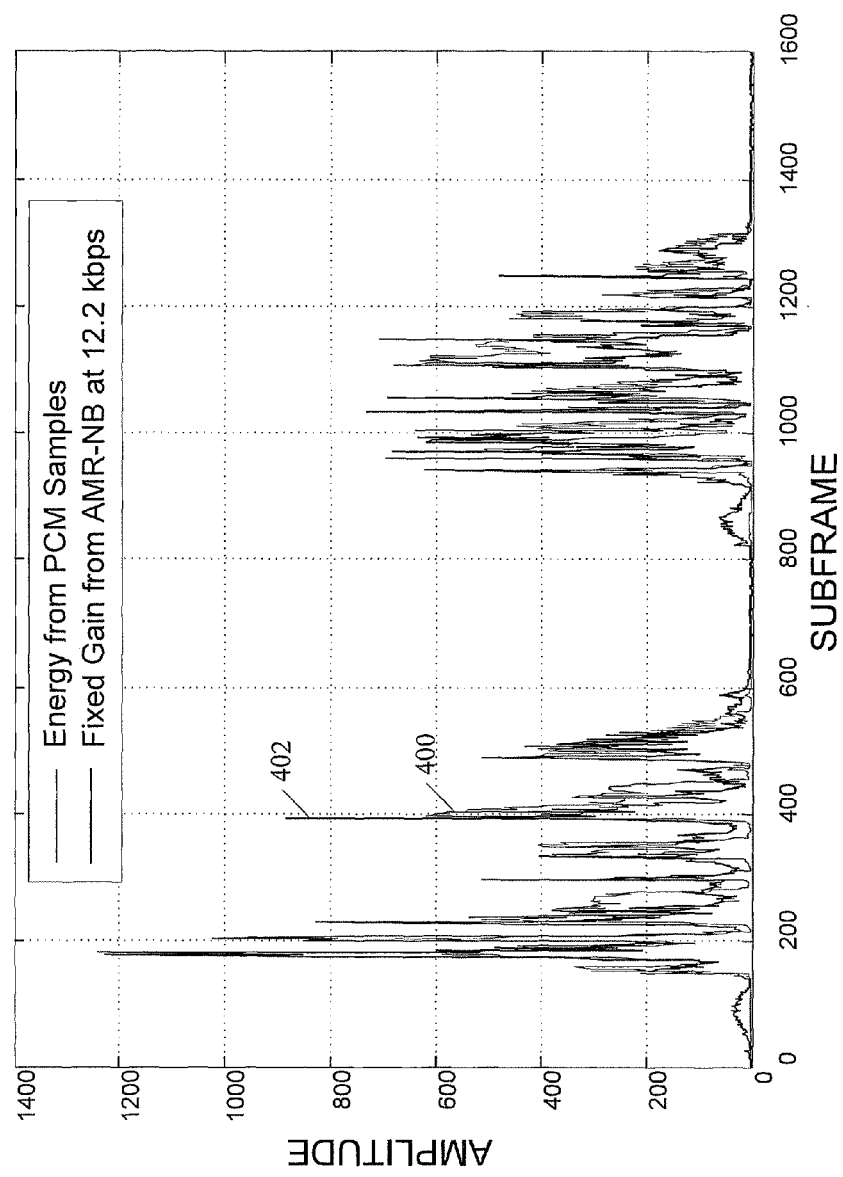
FIG. 4A is a graph showing mean squared energy versus fixed codebook gain for sub-frames of a bit stream that was encoded using an adaptive multi-rate narrowband (AMR-NB) codec at 12.2 kbps.

At first glance, fixed codebook gain $G_F$ would not appear to be a good indicator of speech signal energy of a CELP encoded bit stream. For example, FIG. 4A is a graph of the mean squared energy 400 and the fixed codebook gain 402 for each of 1600 sub-frames of a bit stream that was encoded using an adaptive multi-rate narrowband (AMR-NB) codec at 12.2 kbps. The short term energy $E_{ST}(m)$ is computed for each sub-frame $m_{sf}$ of length $N_{SF}=40$ samples, equivalent to the 5 ms sub-frame length generally used in NB CELP speech codecs such as AMR-NB and G.729 A, using the following equation:

$$E_{ST}(m_{sf}) = \sqrt{\frac{1}{N_{SF}} \cdot \sum_{i=1}^{N_{sf}} s(i)^2} \quad \text{(eq. 13)}$$

The fixed $g_f^{(p)}$ was extracted from the AMR-NB speech decoder at 12.2 kbps. It can be seen in FIG. 4A that the graph of the fixed codebook gain 402 does not always match the envelope of the short term energy of the frames 400.

Figure 4B:
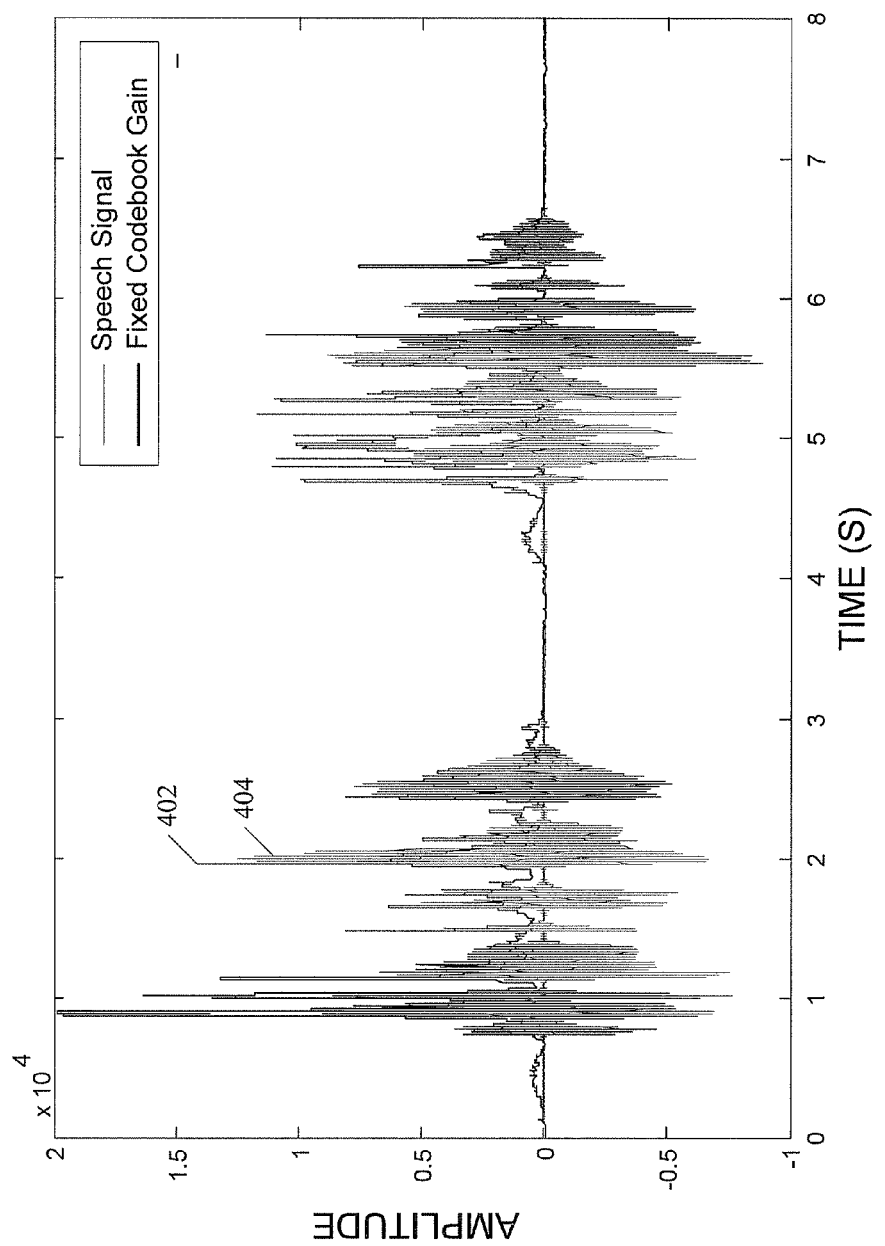
FIG. 4B is graph showing fixed codebook gain versus speech signal amplitude for sub-frames of a bit stream that was encoded using an adaptive multi-rate narrowband (AMR-NB) codec at 12.2 kbps.

However, further experiments revealed that the fixed codebook gain matches the envelope of the decoded speech as it changes from frame to frame. This can be seen in FIG. 4B, which shows that the shape of the curve of the fixed codebook gain 402 approximates the shape of the speech signal amplitude 404. From this observation it can be stated that a decision taken on the basis of the speech power can be fairly accurately approximated by a decision using the fixed codebook gain.

Medium Complexity.

Figure 5:
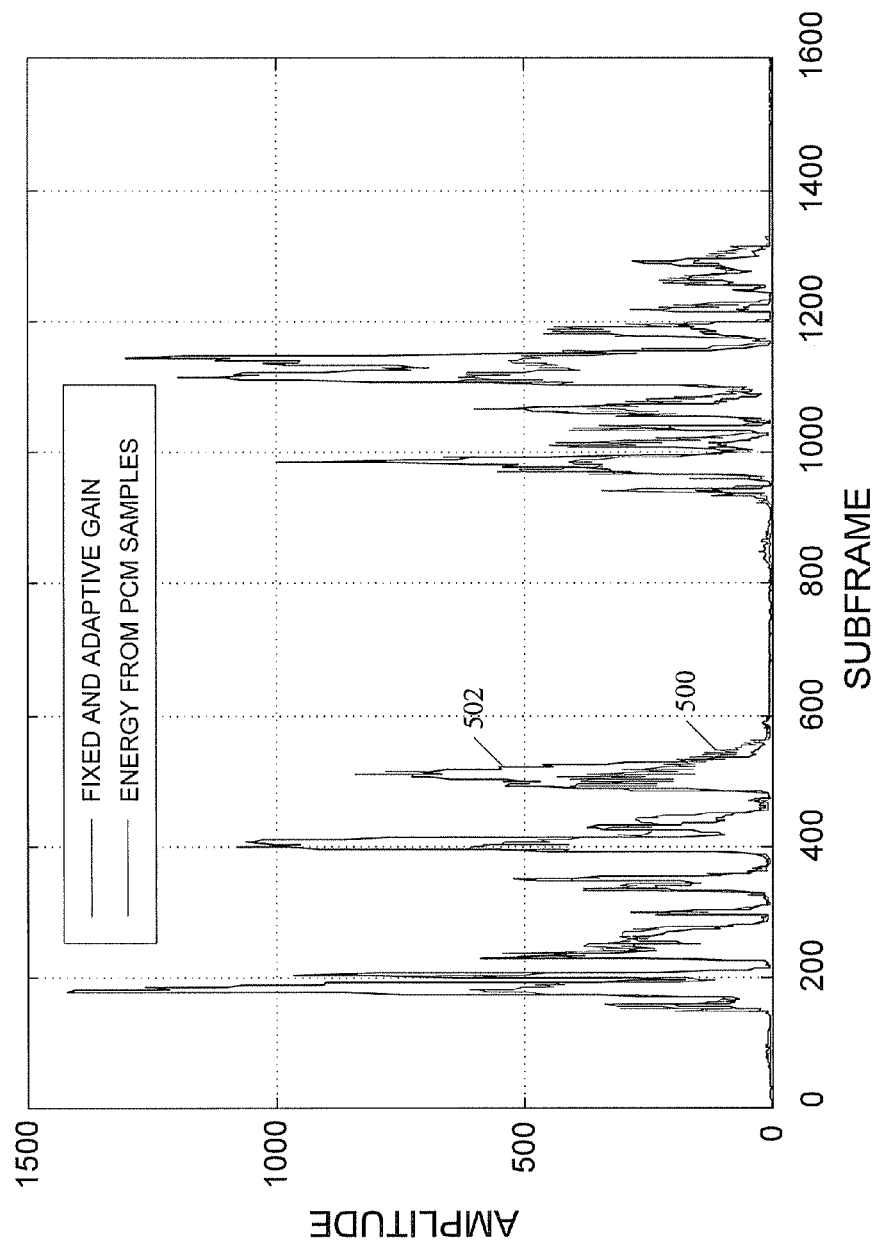
FIG. 5 is a graph showing frame energy calculated from fully decoded PCM sample versus frame energy estimated according to an embodiment of the subject matter described herein, which uses extracted values of fixed gain and adaptive gain.

In one embodiment, herein referred to as the "medium complexity" implementation, the speech energy of the frame or subframe is based on two parameters extracted from the partially decoded bit stream. In one embodiment, the estimated frame energy E.sub.F may be calculated based on a control parameter that represents the short term energy, such as fixed codebook gain G.sub.F, and a control parameter that represents the long term periodicity or correlation in the speech, such as adaptive codebook gain G.sub.A. In one embodiment, the speech energy for frame m, E.sub.F(m) is estimated according to the equation:

$$E.\text{sub}.F(m) = G.\text{sub}.F(m) + G.\text{sub}.A(m) * E.\text{sub}.F(m-1) \quad \text{(eq. 14)}$$

where E.sub.F(m−1) is the estimated speech energy calculated for the previous frame. Experimental results using this method demonstrated that the estimated frame energy E.sub.F highly correlated to the speech energy of the PCM samples. For example, FIG. 5 shows a graph of the frame energy calculated from the fully decoded PCM samples 500 versus the estimated frame energy 502, which was calculated using extracted values of fixed gain and adaptive gain using Equation 14 above. It can be seen that the estimated frame energy E.sub.F(m) 502 is highly correlated to the frame energy 500 of the PCM samples. From this observation it can be stated that a decision taken on the basis of the speech power can be more accurately approximated by a decision using a combination of fixed and adaptive codebook gain. In applications that require a higher correlation with the actual signal's energy and where a small increase in computation is tolerable this implementation may be suitable.

High Complexity.

In one embodiment, herein referred to as the "high complexity" implementation, the speech energy of the frame or subframe is based on several parameters extracted from the partially decoded bit stream. For example, $E_{ST}$ may be calculated based on the fixed codebook gain $G_F$, the adaptive codebook gain $G_A$, the fixed codebook index C, the adaptive codebook index V, and the linear prediction coefficients LPC for the frame or sub-frame. An example high complexity implementation will now be described as it may be applied to CELP-encoded bit streams.

It is a characteristic of the autocorrelation coefficient sequences $$r_S(j) = \sum_{n=j}^{N-1} s_w(n) \cdot s_w(n-j),$$

$0 \le j \le M$ that the autocorrelation coefficient at zero lag, $r_s(0)$, represents a good approximation of the signal energy in the current frame or sub-frame. Accordingly, if $r_s(0)$ can be estimated based on CELP parameters, the speech signal energy will be immediately derived. As will be shown below, in the subject matter described herein, the LPC coefficients for the frame or sub-frame $\{a_s(1), \ldots a_s(M)\}$ are used to calculate the reflection coefficients $\{k_1, \ldots, k_M\}$, which are used along with final prediction error power $E_{err}$ to calculate the autocorrelation coefficients $\{r(0), \ldots, r_s(M)\}$, from which $r_s(0)$ is used to calculated estimated speech energy. As will also be shown below, CELP parameters fixed codebook gain $G_F$, adaptive codebook gain $G_A$, fixed codebook index $C(n)$, and adaptive codebook index $V(n)$ are used to calculate final prediction error power $E_{err}$. In this manner, an estimate of speech signal energy can be calculated based on CELP parameters extracted from a partially decoded CELP frame, obviating the need to fully decode the CELP frame.

Calculation of E.sub.err. Adaptive gain G.sub.A and the pitch value are used to reconstruct the adaptive excitation v(n). The received fixed codebook index and its associated gain G.sub.F are used to build the fixed codebook excitation c(n). Both excitations are added to form the final excitation:

$$\text{exc}(n) = G.\text{sub}.A v(n) + G.\text{sub}.F c(n) \quad \text{(eq. 15)}$$

Some decoders may have logic that will calculate the excitation energy as part of the partial decode process, prior to performing the full decode. In such instances, the excitation energy may be available for use by the processes below, in which case the calculation shown in Equation 14 may be skipped. Likewise, if an encoding scheme calculates excitation energy and embeds the calculated value as an additional parameter in the bit stream, then that excitation value may be extracted and used directly, in which case Equation 14 may be skipped.

The final prediction error power $E_{err}$ is computed as the squared energy of the final excitation:

$$E_{err} = \sqrt{\sum_{i=1}^{N_{sf}} exc(i)^2} \quad \text{(eq. 16)}$$

Where $N_{sf}$ represents the number of samples per sub-frame (or frame).

Some decoders perform classification of received frames or sub-frames to determine whether the frame or sub-frame is noise-like or not. In these embodiments, the decoder may have already calculated the energy of the excitation signal, in which case the energy of the excitation signal can be directly obtained from the decoder.

Calculation of $r_s(0)$.

The subject matter described herein takes advantage of the fact that there is a one-to-one correspondence between the two sets of quantities $\{E_{err}, k_1, \ldots, k_M\}$ and $\{r_s(0), \ldots, r_s(M)\}$ in that if we are given one, we may uniquely determine the other in a recursive manner. To calculate the value of $r_s(0)$, the values of final prediction error power $E_{err}$ and reflection coefficients $\{k_1, \ldots, k_M\}$ are determined.

$E_{err}$ has been calculated as described above. In order to calculate reflection coefficients $\{k_1, \ldots, k_M\}$, the inverse Levinson-Durbin algorithm is used. For a set of LPC coefficients $(1, a_M^{(1)}, \ldots, a_M^{(M)})$, the reflection coefficients $\{k_1, \ldots, k_M\}$ can be obtained using the following recursion:

For $m = M-1, \ldots, 2$ $$K_m = a_m^{(m)} \quad \text{(eq. 17)}$$

$$F = 1 - (K_m)^2$$

$$a_{m-1}^{(t)} = \frac{a_m^{(t)}}{F} - \frac{K_m \cdot a_m^{(m-t)}}{F}, \quad 1 \leq t \leq m$$

And finally:

$$K_1 = -a_1^{(1)} \quad \text{(eq. 18)}$$

The reflections coefficients are in any case in the range from −1 to 1. The following expression can be considered as $\kappa_t = a_t^{(t)}$:

$$\begin{bmatrix} a_k^{(t)} \\ a_{t-k}^{(t)} \end{bmatrix} = \begin{bmatrix} 1 & \kappa_t \\ \kappa_t & 1 \end{bmatrix} \cdot \begin{bmatrix} a_k^{(t-1)} \\ a_{t-k}^{(t-1)} \end{bmatrix}, \quad \text{(eq. 19)}$$

$k = 0, 1, \ldots, t$ and $t = 1, \ldots, M$

Solving Equation 15 and assuming that $|\kappa_t| < 1$ at the $a_t^{(t-k)}$, we have:

$$a_k^{(t-1)} = \frac{a_k^{(t)} - a_t^{(t)} \cdot a_{t-k}^{(t)}}{1 - |a_t^{(t)}|^2}, \text{ and } k = 0, 1, \ldots, t \quad \text{(eq. 20)}$$

Since $\kappa_t = a_t^{(t)}$, the algorithm decreases from $t=M$ to $t=1$ and the reflection coefficients are given by:

$$\kappa_t = a_t^{(t)}, \text{ with } t = M, M-1, \ldots, 1 \quad \text{(eq. 21)}$$

From the reflection coefficients, the autocorrelations coefficients are computed. From the formula:

$$\sum_{k=0}^{t-1} a_k^{(t-1)} \cdot r_S(k-t) = -\kappa_t \cdot E_{err}(t-1) \quad \text{(eq. 22)}$$

and using the fact that $r_s(-t) = r_s(t)$, $r_s(0) = E_{err}(0)$, and $a_0^{(t)} = 1$ the autocorrelations coefficients can be calculated by the following formula:

$$r_S(t) = -\kappa_t \cdot E_{err}(t-1) \cdot \sum_{k=0}^{t-1} a_k^{(t-1)} \cdot r_S(t-k) \quad \text{(eq. 23)}$$

In some embodiments, the first autocorrelation coefficient may need to be adjusted. During the encoding process, a pre-processing is required to prepare the speech samples. The current frame is high pass filtered and each sample is divided by two to eliminate undesired low frequencies components and to prevent overflow. Look ahead is also performed in some modes. At the decoder side, these processes need to be compensated. Thus, in some embodiments, the LPC coefficients magnitude is used to compensate the effect of the pre-processing so that the final estimated energy of the current sub-frame is given by the equation:

$$\hat{E}_S = \left( \sum_{i=0}^{M} |\hat{a}_s(i)| \right) \cdot \hat{R}(0) \quad \text{(eq. 24)}$$

At this point, the LPC coefficients have been already extracted from the decoder. In embodiments where the decoder calculates or provides the reflection coefficients, the process of estimation of speech signal energy described below can start with the reflection coefficients instead of extracting the LPC coefficients, and avoid the need to perform the inverse recursive Levinson-Durbin algorithm, which is used to convert LPC coefficients to reflection coefficients.

Figure 6:
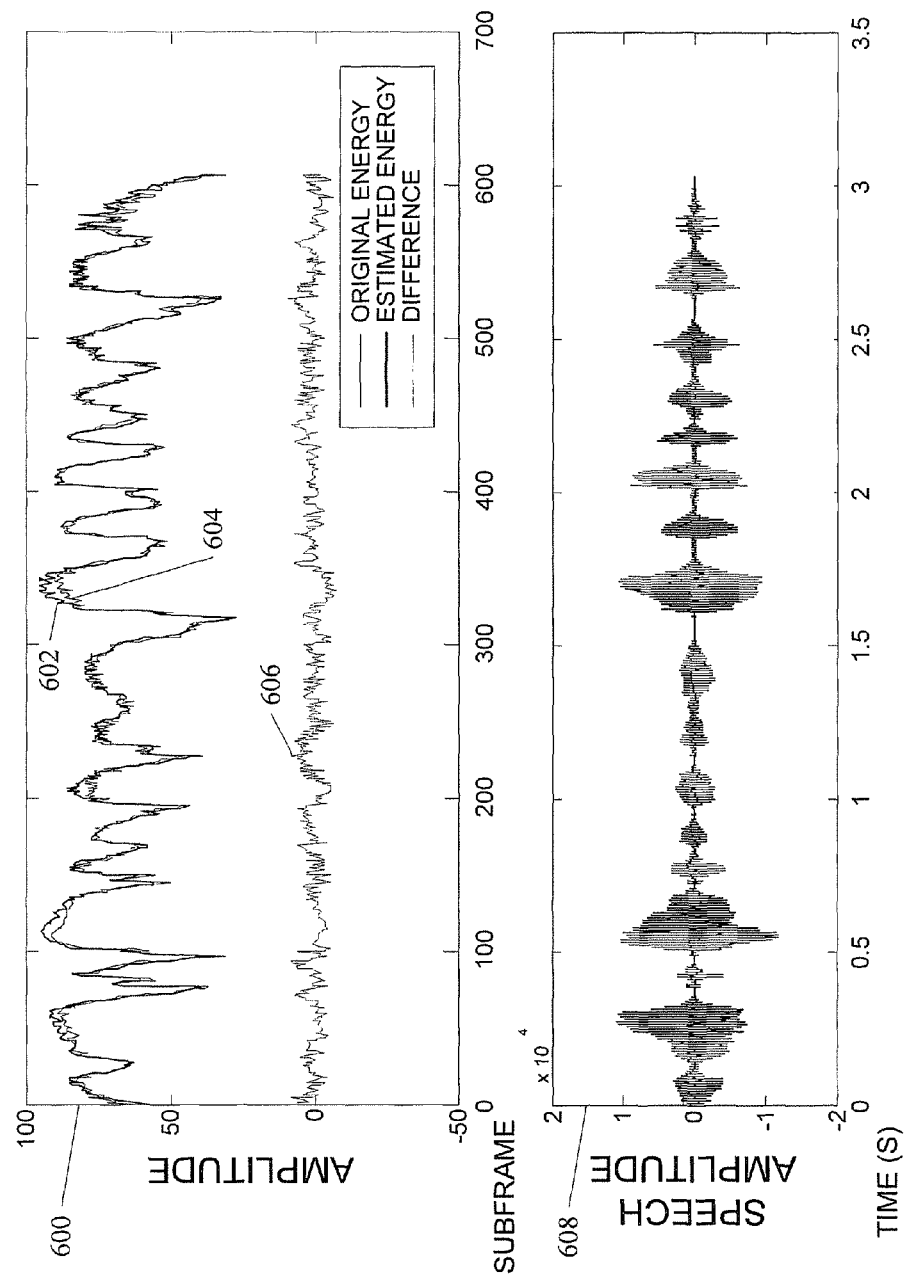
FIG. 6 includes a pair of graphs showing actual speech energy, speech energy estimated according to another embodiment of the subject matter described herein, and the error between the actual and estimated speech energy for 700 sub-frames of a CELP-encoded voice sample.

FIG. 6 includes a pair of graphs illustrating the performance of a system that implements the high-complexity algorithm. Graph 600 shows a comparison between actual speech energy 602 and estimated speech energy 604, along with a plot showing the difference or error 606 between the actual and estimated speech energy for 700 sub-frames of a CELP-encoded voice sample. Graph 608 shows the envelope of the original speech waveform. It can be seen that speech energy estimation produced by the high-complexity algorithm has a very high correlation to the actual speech energy of the bit stream. Yet even this high-complexity implementation was less computationally expensive than the conventional methods that either required full decoding of the bit stream or required calculation of the LPC filter energy.

Calculating a Compensated Speech Energy

In one embodiment, once the speech energy $E_{ST}$ is determined, it may be used to calculate a moving average energy (audio level) for the frame, STA(m). In one embodiment, the audio level $STA^{(p)}(m)$ is computed as an exponential moving average energy (EMAE) of factor ⅔ of the speech energy of the frame or sub-frame, taking into account the audio level of the previous speech segments:

$$STA^{(p)} = STA^{(p)}(m-1)$$

for $i = m_{sf,1}, m_{sf,2}$ (eq. 25)

$$STA^{(p)} = ((STA^{(p)} \cdot 3) - 2 \cdot (STA^{(p)} - E_{ST}^{(p)}(i)))/3$$

And $$STA^{(p)}(m) = STA^{(p)}$$ (eq. 26)

Note that STA may be calculated for bit-streams that are fully decoded and for which the speech energy is calculated in the conventional manner.

In one embodiment, a dynamic threshold called a noise floor may also be computed. The audio level may then be compared to the noise floor. For example, in one embodiment, if the audio level is not higher than the noise floor, it may be assumed that the bit stream contains background or environment noise and not speech (or perhaps speech that is not loud enough to be heard over the background noise), in which case the system may opt not to bother to fully decode the bit-stream. This technique is useful for telephone conferencing systems, for example, in which only the input bit-streams from speaking participants need to be added to the mix that is fed back to all participants. Conference systems will be discussed in more detail below.

In one embodiment, an intermediate noise floor Floor_int$^{(p)}$(m) is calculated for the bit-stream using the following equation:

$$\text{Floor\_int}^{(p)}(m) = (\text{Floor\_int}^{(p)}(m-1) \cdot 256 - \text{Floor\_int}^{(p)}(m-1) + STA^{(p)}(m))/256 \quad \text{(eq. 27)}$$

Where Floor_int$^{(p)}$(m) is the calculated noise floor for the current segment and Floor_int$^{(p)}$(m−1) is the calculated noise floor for the previous segment. The dynamic threshold or noise floor NoiseFloor$^{(p)}$(m) is then computed based on the intermediate noise floor and the current audio level. In one embodiment, the dynamic noise floor may be calculated using the following equations:

$$\text{NoiseFloor}^{(p)}(m) = STA^{(p)}(m) \quad \text{if} \quad \text{Floor\_int}^{(p)}(m) > STA^{(p)}(m)$$

else $$\text{NoiseFloor}^{(p)}(m) = \text{Floor\_int}^{(p)}(m)$$ (eq. 28)

The dynamic noise floor is then used to calculate a compensated speech energy for the segment. In one embodiment, the following equations are used:

if $STA^{(p)}(m) > \text{NoiseFloor}^{(p)}(m)$ $$STA^{(p)}(m) = STA^{(p)}(m) - \text{NoiseFloor}^{(p)}(m)$$

else $$STA^{(p)}(m) = 0$$ (eq. 29)

In this example, if the current audio level is above the noise floor, the noise floor is subtracted from the current audio level to create the compensated audio level. On the other hand, if the current audio level is below the noise floor, the compensated audio level is set to 0, reflecting the fact that it is likely that the bit stream contains no speech energy, e.g., the sender is not talking during that segment of the bit-stream.

Advantages Over Conventional Methods.

The subject matter described herein exhibits several advantages over conventional methods. The methods described above provide a reduction of the computation load since they provide a way to determine the speech energy of a bit stream without having to fully decode that bit stream. The processing resources so saved may be used to increase the system capacity and bring a complexity reduction more than twenty fold for most CELP codecs when compared to conventional methods, and can reduce system delay, both by reducing the computational process required to determine the speech energy of the bit stream and by quickly identifying bit streams that may be ignored because they do not currently carry any speech information. The methods described herein can be easily implemented, requiring only extraction of parameters and a small number of operations. The methods described herein can be applied to any codec that computes LPC coefficients. Examples of such codecs include AMR, EVRC, 0.729, G722.2, Silk, and others.

Application to Conferencing Systems.

During a multi points voice conference where mixing is based on the loudest talkers (LT), active speaker detection is required to perform selection and mixing of the decoded speech signals. If the participants are using CELP speech codecs, they will carry approximately the same type of parameters: the linear prediction coefficients (LPC) through their line spectral frequencies (LSF) representation or immitance spectral frequencies (ISF) representation, the fixed and adaptive gains, the pitch delay and the fixed codebook index. Using the methods described above, it is possible to calculate an estimated speech energy or audio level for each participant using parameters extracted from a partially decoded bit stream and use the estimated audio levels to identify speaking participants. In one embodiment, only a subset of the speaking participants may be selected for inclusion.

Figure 7:
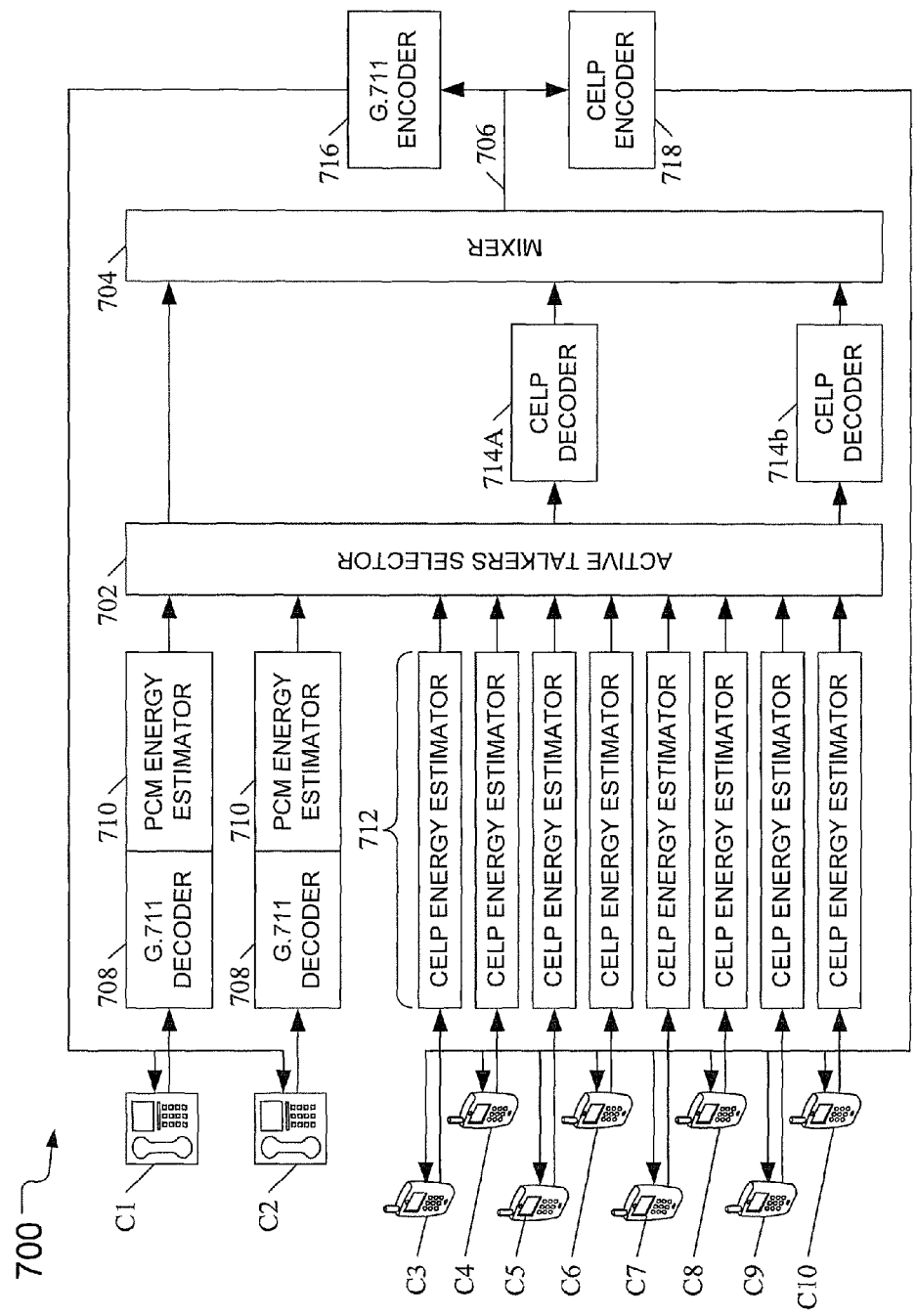
FIG. 7 is a block diagram illustrating an exemplary system for speech energy estimation using partially decoded CELP-encoded frames as applied to a teleconferencing system according to yet another embodiment of the subject matter described herein.

FIG. 7 is a block diagram illustrating an exemplary system for speech energy estimation using partially decoded CELP-encoded frames as applied to a teleconferencing system according to another embodiment of the subject matter described herein.

In one embodiment, system 700 is a teleconferencing system that supports multiple conference participants. In the embodiment illustrated in FIG. 7, system 700 is being used by ten conference participants, identified as C1 through C10. Conference participants C1 and C2 are connected using telephone equipment that uses the 0.711 codec to encode the bit stream. Conference participants who use 0.711 codecs are herein referred to as "G.711 participants." Conference participants C3 through C10 are connected using telephone equipment that uses a CELP codec to encode the bit stream. Conference participants who use CELP codecs are herein referred to as "CELP participants."

Teleconferencing system 700 accepts input from the conference participants, analyzes the inputs, and selects one or more of the inputs to be mixed to a main output mix, which is then sent back out to all conference participants. Thus, in the embodiment in FIG. 7, teleconferencing system 700 includes an active talkers selector module 702 which selects one or more conference participants to be input into a mixer 704, which creates the main output mix 706. In one embodiment, the subset of speaking participants may be selected based on the energy level, e.g., the loudest talkers are selected over quieter talkers. In one embodiment, the bit streams from only the selected subset of speakers are decoded and included in the mix. In this manner, the computational load of the conferencing system may be greatly reduced. In one embodiment, an algorithm based on the dynamic audio levels of all N participants in a telephone conference is used to select the M active talkers for the mixing. The participant with the highest dynamic audio level amplitude is classified as the first active speaker in the mixer, and so on up to the .sup.Mm audio level amplitude. In one embodiment, in order to avoid annoyances that could irritate listeners, a mechanism may be introduced to avoid rapid changes of the first two active speakers (if M>1). To do so, windows of size 400 ms and 200 ms may be introduced to track the first and second active speakers respectively. These two active speakers will be dropped out of the mixer only if they are not selected within that window period.

In the embodiment illustrated in FIG. 7, in order to identify active talkers, system 700 first estimates the speech energy present in the bit streams from all conference participants C1 through C10. For G.711 participants, the G.711 bit stream must first be fully decoded using a G.711 decoder 708 and the fully decoded bit stream is sent to a PCM energy estimator 710, which calculates the speech energy of the fully decoded bit stream. The energy estimation is then sent by the PCM energy estimator 710 to the active talkers selector 702.

For CELP participants, however, it is not necessary to fully decode the CELP bit stream. Instead, CELP energy estimators 712 are used to partially decode the CELP-encoded bit streams and send an estimate of the speech energy to active talkers selector 702. In one embodiment, each CELP energy estimator 712 may estimate speech energy using any one of the estimation methods detailed in the subject matter described herein without having to fully decode the CELP-encoded bit stream.

Once the speech energy is estimated for all conference participants, one or more active talkers are selected for inclusion in the main output mix. In the embodiment illustrated in FIG. 7, for example, active talkers selector 702 has chosen three conference participants, C1, C5, and C10, for inclusion in the mix. Since participant C1 is a G.711 participant, the bit stream for C1 has already been fully decoded and is therefore sent directly to mixer 704. Participants C5 and C10, however, are CELP participants, and so their bit streams must be fully decoded, i.e., by CELP decoders 714A and 714B-b, respectively. The fully decoded bit streams are then sent to mixer 704. Since the computational load imposed on system 700 by each CELP energy estimator 712 is relatively very light compared to the computational load imposed by the CELP decoders 714A and 714Bb, system 700 can support a larger number of CELP participants than a comparable system that fully decoded each CELP bit stream before estimating the bit stream's speech energy yet included only a subset of inputs into the main output mix.

In one embodiment, main output mix 706 is encoded and distributed to each of the conference participants. In the embodiment illustrated in FIG. 7, main output mix 706 is sent to both a G.711 encoder 716, the output of which is sent out to the G.711 participants C1 and C2, and a CELP encoder 718, the output of which is sent out to the CELP participants C3 through C10. Thus, in the embodiment illustrated in FIG. 7, a conference bridge may be able to both estimate the speech energy of partially decoded bit streams using the methods described above and also calculate the speech energy in the conventional manner, i.e., using fully decoded bit streams. For example, for conference participants that use CELP codecs, algorithms that estimate speech energy based on parameters extracted from partially decoded bit streams, such as the low, medium, or high complexity algorithms described above, may be used to calculate an estimated speech energy, while for conference participants that use non-CELP codecs, their bit streams may be fully decoded to PCM waveforms which are then used to calculate actual energy levels. In this manner, a conference bridge can support both CELP and non-CELP encoded bit streams.

However, each bit stream that must be fully decoded may consume greater processing resources than a bit streams that may be partially decoded, with the result that the greater the number of non-CELP encoded bit streams that are part of the conference, the processing load goes up (or the total number of possible conference participants may go down). Furthermore, overall quality of the service may be reduced in VoIP applications due to the additional delay imposed by the jitter and codecs processing. The capacity of the conference bridge may be constrained by the DSP capacity and the request of real time processing (algorithmic delay). Moreover, such technique needs a large storage location to access the decoded speech samples and the DSP capacity may be further reduced.

In another scenario, all of the conference participants that are using teleconferencing system 700 might be CELP participants, i.e., non G.711 or other non-CELP participants. In this case, teleconferencing system 700 would not need G.711 decoders 708 or PCM energy estimators 710, which could free up additional resources for use as CELP energy estimators 712. Since the more participants that are allowed to be added to main output mix 706, the less coherent main output mix 706 may become, the number of participants that are allowed to join is often a relatively small number, e.g., 5 or less. In this scenario, this means that at most five CELP decoders 714 would be necessary. Since CELP energy estimators 712 are not very computationally expensive, teleconferencing system 700 could potentially support many, many more (e.g., orders of magnitude more) CELP participants than the number of participants that are allowed to be included in the final mix. In contrast, conventional teleconferencing systems must fully decode the bit stream of each conference participant just to determine speech energy levels. This overhead constrains the number of conference participants that can be supported by conventional teleconferencing systems when compared to teleconferencing system 700, given the same processing power for both types of systems.

The subject matter described herein provides several benefits to conference bridges and other voice conferencing systems, including:

Reduced usage of speech decoding when CELP codec's are present. In the traditional approach, each participant's bit stream is decoded and speaker classification is then performed based on the PCM samples of the decoded speech signal. Using the methods described herein, the full decoding process of a given participant bit stream is only performed if this participant is selected as an active speaker or selected as an allowed subset of active speakers. The methods described herein are suitable for real time application as the algorithmic delay will be reduced.

Significantly reduced processing requirements. For most CELP decoders, the main tasks are extraction and calculation of parameters, synthesis, and post filtering. Synthesis accounts for about 55% of the processing load, post-filtering accounts for about 37% of the processing load, and extraction and calculation of parameters accounts for remaining 8% of the processing load. For every bit stream that is identified as being a bit stream that need not be fully decoded, the methods described herein allow a reduction of 92% of the processing load for those streams so identified. This approach is extremely beneficial for real time applications.

Other Applications

The methods for estimating speech energy using parameters extracted from partially decoded bit streams have other applications as well:

To enable/disable voice quality enhancements (VQEs) such as an acoustic echo control (AEC), an automatic gain control (AGC), or a background noise reduction (BNR) so they are only activated when speech is detected hence reducing CPU usage.

For transcoding free operation (TrFO): VQEs could be applied on the AMR streams but only if speech is detected so full transcoding is not required during period of silence.

For tandem-free operation (TFO): like TrFO, VQEs could be applied on TFO AMR frames when speech is detected; the energy detection would be done on the frames embedded in the PCM two least significant bits (i.e. the AMR frame).

Whenever smart transcoding is used (from CELP codec A to CELP codec B) VQEs could only be applied if energy is detected.

Frame energy is a robust indicator for Voice Activity and contains perceptual information; therefore the suggested methods can be used in voice activity detection (VAD) algorithm.

Frame energy can be used to compute objectives measures as in perceptual evaluation of speech quality (PESQ), such as defined in ITU-T P.862.

Frame energy can be used as voiced/unvoiced detection (VUD). Short term energy is higher in voiced segments and lower in unvoiced segments.

Frame energy can be used in artificial bandwidth extension (BWE) based on model approach: energy based features extraction using short term speech energy. Where the artificial BWE algorithm is implemented just after a CELP decoder, the decoded parameters can be directly used.

Frame energy can be used within the CELP decoders during spectral interpolation (e.g., interpolation of the LSF coefficients) to improve the CELP decoders.

It will be understood that various details of the subject matter described herein may be changed without departing from the scope of the subject matter described herein. Furthermore, the foregoing description is for the purpose of illustration only, and not for the purpose of limitation.

What is claimed is:

1. A method comprising:
receiving a plurality of encoded bit streams including at least one CELP-encoded bit stream and at least one non-CELP-encoded bit stream;
partially decoding the at least one CELP-encoded bit stream in a data processor to provide a partially decoded bit stream;
estimating speech energy of the at least one CELP-encoded bit stream based on a set of four or fewer CELP parameters extracted from the partially decoded bit stream in the data processor;
estimating speech signal energy of the at least one non-CELP-encoded bit stream by fully decoding the non-CELP-encoded bit stream and determining the speech signal energy of the fully-decoded non-CELP bit stream;
using the estimated speech energies to identify bit streams that contain active speech data; and
selecting, using the estimated speech energies, at least one bit stream from among bit streams identified as containing active speech data.

2. The method of claim 1 wherein the set of four or fewer CELP parameter comprises four or fewer parameters selected from the set of: a fixed codebook gain; an adaptive codebook gain; a set of linear predictive coding coefficients; a set of reflections coefficients; a fixed codebook index; an adaptive codebook index; and an energy of the excitation signal.

3. The method of claim 1 wherein the set of four or fewer parameters consists of a fixed codebook gain parameter ($G_F$).

4. The method of claim 3 wherein estimating the speech energy comprises calculating estimated speech energy ($E$) using the equation $E = G_F$.

5. The method of claim 3 wherein the set of parameters consists of a fixed codebook gain parameter ($G_F$) and an adaptive codebook gain parameter ($G_A$).

6. The method of claim 5 wherein estimating the speech energy comprises, for each frame m, calculating estimated speech energy for the frame ($E_F$) using the equation $E_F(m) = G_F(m) + G_A(m) * E_F(m-1)$,
wherein $E_F(m)$ is the estimated speech energy for the frame, $G_F(m)$ is the fixed codebook gain for the frame, $G_A(m)$ is the adaptive codebook gain for the frame, and $E_F(m-1)$ is the estimated speech energy for the previous frame.

7. The method of claim 1 wherein using the estimated speech energies to identify bit streams that contain active speech data further comprises using the estimated speech energy of the at least one CELP-encoded bit stream to determine, without fully decoding the at least one CELP-encoded bit stream, whether the bit stream contains active speech data.

8. The method of claim 1 further comprising estimating a speech energy of each of a plurality of CELP-encoded bit streams using the set of four or fewer CELP parameters to determine an estimated speech energy of each of the CELP-encoded bit streams without fully decoding the CELP-encoded bit streams, and using the estimated speech energies to identify CELP-encoded bit streams that contain active speech data.

9. The method of claim 1 wherein selecting at least one bit stream from among bit streams identified as containing active speech data comprises selecting bit streams having estimated speech energy higher than a threshold value.

10. The method of claim 1 wherein selecting at least one bit stream from among bit streams identified as containing active speech data comprises selecting bit streams having the highest values of estimated speech energy.

11. The method of claim 1 wherein the at least one selected bit stream is used as an input into a mixer.

12. The method of claim 11 wherein the plurality of encoded bit streams are received at a conference bridge from a plurality of conference participants and wherein the output of the mixer is provided to the plurality of conference participants.

13. The method of claim 1 wherein the fully decoded at least one non-CELP-encoded-bit stream comprises a pulse code modulated (PCM) bit stream and wherein short-term energy values comprise mean square energy values of the PCM bit stream.

14. The method of claim 1 further comprising: calculating in the data processor a moving average energy of an audio level (STA) for a frame of data in the at least one CELP-encoded bit stream; calculating a dynamic noise floor (NF) for the frame; calculating a compensated moving average energy of the audio level (cSTA) for the frame; and calculating a speech energy for the frame based on the cSTA.

15. The method of claim 1, wherein partially decoding the at least one CELP-encoded bit stream is performed on either a frame-by-frame basis or a sub-frame-by-sub-frame basis and does not require post-processing.

16. A method comprising:
receiving a plurality of encoded bit streams including at least one CELP-encoded bit stream and at least one non-CELP-encoded bit stream;

partially decoding the at least one CELP-encoded bit stream in a data processor;
extracting at least one CELP parameter from the partially decoded at least one CELP-encoded bit stream with the data processor;
estimating speech energy of the at least one CELP-encoded bit stream based on the extracted at least one CELP parameter, using the data processor, without calculating a linear prediction coding (LPC) filter response energy;
estimating speech signal energy of the at least one non-CELP-encoded bit stream by fully decoding the non-CELP-encoded bit stream and determining the speech signal energy of the fully-decoded non-CELP bit stream;
using the estimated speech energies to identify bit streams that contain active speech data; and
selecting, using the estimated speech energies, at least one bit stream from among bit streams identified as containing active speech data.

17. The method of claim 16 wherein estimating the speech energy of the at least one CELP-encoded bit stream based on the at least one CELP parameter without calculating a linear prediction coding (LPC) filter response energy comprises extracting LPC coefficients and using the extracted LPC coefficients to reconstruct a frame energy calculation performed during encoding of the at least one CELP-encoded bit stream.

18. The method of claim 16 wherein estimating the speech energy of the at least one CELP-encoded bit stream based on the at least one CELP parameter without calculating a linear prediction coding (LPC) filter response energy comprises extracting LPC coefficients for a frame, using the extracted LPC coefficients to reconstruct a set of autocorrelation coefficients for the frame, and estimating the speech energy of the frame based on at least one autocorrelation coefficient from the set of autocorrelation coefficients for the frame.

19. The method of claim 16 wherein estimating the speech energy of the at least one CELP-encoded bit stream based on the at least one CELP parameter without calculating a linear prediction coding (LPC) filter response energy consists of, for each frame m:
extracting a fixed codebook gain parameter $G.sub.F(m)$ for the frame, an adaptive codebook gain parameter $G.sub.A(m)$ for the frame, and a set of LPC coefficients $\{LPC\}(m)$ for the frame;
for each sub-frame n, using $G.sub.A(m)$ and an extracted pitch delay for the sub-frame to calculate an adaptive excitation for the sub-frame $v(n)$, using $G.sub.F(m)$ and an extracted fixed codebook index for the sub-frame to calculate a fixed codebook excitation for the sub-frame $c(n)$, and calculating a sub-frame excitation energy $exc(n)$ using the equation $$exc(n)=G.sub.F(m)*c(n)+G.sub.A(m)*v(n);$$

calculating frame error power $E.sub.ERR(m)$ as the square root of the sum of the squares of the sub-frame excitation energies; calculating frame reflections coefficients $\{K\}(m)$ based on $\{LPC\}(m)$;
calculating frame autocorrelations coefficients $\{R\}(m)$ based on $\{K\}(m)$; and calculating an estimated speech energy for the frame $E.sub.F(m)$ based on $E.sub.ERR(m)$ and $\{R\}(m)$.

20. The method of claim 19 wherein calculating frame reflections coefficients $\{K\}(m)$ based on $\{LPC\}(m)$ comprises using values of $\{LPC\}(m)$ as inputs into an inverse Levinson-Durbin algorithm to calculate values of $\{K\}(m)$.

21. The method of claim 16 further comprising:
calculating a moving average energy of an audio level (STA) for a frame of data in the at least one CELP-encoded bit stream;
calculating a dynamic noise floor (NF) for the frame;
calculating a compensated moving average energy of the audio level (cSTA) for the frame; and
calculating a speech energy for the frame based on the cSTA.

22. The method of claim 16, wherein using the estimated speech energies to identify bit streams that contain active speech data further comprises using the estimated speech energy of the at least one CELP-encoded bit stream to determine, without fully decoding the at least one CELP-encoded bit stream, whether the at least one CELP-encoded bit stream contains active speech data.

23. The method of claim 16 further comprising estimating the speech energy of each of a plurality of CELP-encoded bit streams using the at least one CELP parameter to determine an estimated speech energy of each of the CELP-encoded bit streams without fully decoding the CELP-encoded bit streams, and using the estimated speech energies to identify CELP-encoded bit streams that contain active speech data.

24. The method of claim 16, wherein partially decoding the at least one CELP-encoded bit stream is performed on either a frame-by-frame basis or a sub-frame-by-sub-frame basis and does not require post-processing.

25. A system for estimating speech energy comprising:
an interface module for receiving a plurality of encoded bit streams including at least one CELP-encoded bit stream and at least one non-CELP-encoded bit stream; and
a processing module, including a hardware processor, for:
partially decoding the at least one CELP-encoded bit stream;
estimating speech energy of the at least one CELP-encoded bit stream based on a set of four or fewer CELP parameters extracted from a resulting partially decoded bit stream;
estimating speech signal energy of the at least one non-CELP-encoded bit stream by fully decoding the non-CELP-encoded bit stream and determining the speech signal energy of the fully-decoded non-CELP bit stream;
using the estimated speech energies to identify bit streams that contain active speech data; and
selecting, using the estimated speech energies, at least one bit stream from among bit streams identified as containing active speech data.

26. A system for estimating speech energy comprising:
an interface module for receiving a plurality of encoded bit streams including at least one CELP-encoded bit stream and at least one non-CELP-encoded bit stream; and
a processing module including a hardware processor for:
partially decoding the at least one CELP-encoded bit stream;
extracting at least one CELP parameter from the partially decoded at least one CELP-encoded bit stream
estimating speech energy of the at least one CELP-encoded bit stream based on the extracted at least one CELP parameter without calculating a linear prediction coding (LPC) filter response energy;
estimating speech signal energy of the at least one non-CELP-encoded bit stream by fully decoding the non-CELP-encoded bit stream and determining the speech signal energy of the fully-decoded non-CELP bit stream;

using the estimated speech energies to identify bit streams that contain active speech data; and selecting, using the estimated speech energies, at least one bit stream from among bit streams identified as containing active speech data.

27. A non-transitory computer readable medium having stored thereon executable instructions that when executed by the processor of a computer control the computer to perform steps comprising:

receiving a plurality of encoded bit streams including at least one CELP-encoded bit stream and at least one non-CELP-encoded bit stream;

partially decoding the at least one CELP-encoded bit stream;

estimating speech energy of the at least one CELP-encoded bit stream based on a set of four or fewer CELP parameters extracted from a resulting partially decoded bit stream;

estimating speech signal energy of the at least one non-CELP-encoded bit stream by fully decoding the non-CELP-encoded bit stream and determining the speech signal energy of the fully-decoded non-CELP bit stream;

using the estimated speech energies to identify bit streams that contain active speech data; and selecting, using the estimated speech energies at least one bit stream from among bit streams identified as containing active speech data.

28. A non-transitory computer readable medium having stored thereon executable instructions that when executed by the processor of a computer control the computer to perform steps comprising:

receiving a plurality of encoded bit streams including at least one CELP-encoded bit stream and at least one non-CELP-encoded bit stream;

partially decoding the at least one CELP-encoded bit stream;

extracting at least one CELP parameter from the partially decoded at least one CELP-encoded bit stream;

estimating speech energy of the at least one CELP-encoded bit stream based on the extracted at least one CELP parameter without calculating a linear prediction coding (LPC) filter response energy;

estimating speech signal energy of the at least one non-CELP-encoded bit stream by fully decoding the non-CELP-encoded bit stream and determining the speech signal energy of the fully-decoded non-CELP bit stream;

using the estimated speech energies to identify bit streams that contain active speech data; and selecting, using the estimated speech energies at least one bit stream from among bit streams identified as containing active speech data.

* * * * *